(12) United States Patent
Abdulgadir et al.

(10) Patent No.: US 12,341,889 B2
(45) Date of Patent: Jun. 24, 2025

(54) COMPUTER ARCHITECTURE AND METHOD FOR PERFORMING LATTICE-BASED CRYPTOGRAPHIC PRIMITIVES WITH RESISTANCE TO SIDE-CHANNEL ATTACKS

(71) Applicant: PQSECURE TECHNOLOGIES, LLC, Boca Raton, FL (US)

(72) Inventors: Abubakr Abdulgadir, Reston, VA (US); Luke Beckwith, Sterling, VA (US)

(73) Assignee: PQSecure Technologies, LLC, Boca Raton, FL (US)

( * ) Notice: Subject to any disclaimer, the term of this patent is extended or adjusted under 35 U.S.C. 154(b) by 0 days.

(21) Appl. No.: 18/718,645

(22) PCT Filed: Aug. 25, 2022

(86) PCT No.: PCT/US2022/041477
§ 371 (c)(1),
(2) Date: Jun. 11, 2024

(87) PCT Pub. No.: WO2024/043890
PCT Pub. Date: Feb. 29, 2024

(65) Prior Publication Data
US 2024/0421993 A1    Dec. 19, 2024

(51) Int. Cl.
*H04L 9/30* (2006.01)
*H04L 9/06* (2006.01)

(52) U.S. Cl.
CPC .......... *H04L 9/3093* (2013.01); *H04L 9/0618* (2013.01); *H04L 9/0643* (2013.01)

(58) Field of Classification Search
CPC .... H04L 9/3093; H04L 9/0618; H04L 9/0643
See application file for complete search history.

(56) References Cited

U.S. PATENT DOCUMENTS

| 11,249,726 B2* | 2/2022 | Langhammer ...... G06F 7/49947 |
| 11,706,019 B2* | 7/2023 | Chandrakasan ...... H04L 9/0841 |
| | | 713/168 |

(Continued)

FOREIGN PATENT DOCUMENTS

| WO | WO-2021032946 A1 * | 2/2021 | ............ G06F 21/123 |
| WO | WO-2021240157 A1 * | 12/2021 | ......... H04L 63/0442 |
| WO | WO-2021252294 A1 * | 12/2021 | ............ G06F 17/142 |

OTHER PUBLICATIONS

Oder T. Efficient and side-channel resistant implementation of lattice-based cryptography (Doctoral dissertation, Dissertation, Bochum, Ruhr-Universität Bochum, 2019). (Year: 2019).*

(Continued)

*Primary Examiner* — James R Turchen
(74) *Attorney, Agent, or Firm* — Mark C. Johnson; Johnson Dalal

(57) ABSTRACT

A computer processing system configured to perform lattice-based cryptographic primitives with resistance to side-channel attacks with a computer processing architecture operably configured to perform at least one of key generation, key encapsulation, and key decapsulation and process security sensitive data, a sampling submodule performing hashing operations and centered binomial sampling routines, a polynomial arithmetic unit performing polynomial multiplication, polynomial addition, and polynomial subtraction by processing the security sensitive data that is divided into shares stored on a plurality of memory banks, an auxiliary submodule mathematical operations, a data interface unit operably configured to perform input and output operations and to input data and output data in shares, and de-serialize the input data into polynomial coefficients utilized by the polynomial arithmetic unit, and a controller submodule operably configured to sequence any operations needed to (Continued)

perform the at least one of key generation, key encapsulation, and key decapsulation.

10 Claims, 7 Drawing Sheets

(56) References Cited

U.S. PATENT DOCUMENTS

| | | | | |
|---|---|---|---|---|
| 2019/0312728 A1* | 10/2019 | Poeppelmann | ....... | H04L 9/0662 |
| 2020/0259649 A1* | 8/2020 | Garcia Morchon | .. | H04L 9/0838 |
| 2020/0265167 A1* | 8/2020 | Banerjee | ............... | H04L 9/0631 |
| 2020/0313886 A1* | 10/2020 | Poeppelmann | ....... | H04L 9/3236 |
| 2022/0171885 A1* | 6/2022 | Saarinen | ................. | G06F 21/72 |
| 2022/0303133 A1 | 9/2022 | Pessl | | |
| 2022/0337398 A1 | 10/2022 | Schneider et al. | | |
| 2023/0030316 A1* | 2/2023 | Pessl | ....................... | G06F 21/75 |
| 2023/0254115 A1* | 8/2023 | Hamburg | ................ | H04L 9/003 380/28 |
| 2023/0412370 A1* | 12/2023 | Meyer | ..................... | H04L 9/003 |
| 2024/0031127 A1* | 1/2024 | Basso | ..................... | H04L 9/002 |
| 2024/0031140 A1* | 1/2024 | Basso | ..................... | H04L 9/002 |
| 2024/0154718 A1* | 5/2024 | Cline | .................... | H04L 1/0029 |
| 2024/0187206 A1* | 6/2024 | Takarabt | ............... | H04L 9/3093 |
| 2024/0249768 A1* | 7/2024 | Yang | ........................ | G11C 11/54 |

OTHER PUBLICATIONS

Fritzmann. "Masked accelerators and Instruction Set Extensions for Post-Quantum Cryptography" 414-460. IACR Transactions on Cryptographic Hardware and Embedded Systems. [online]. Nov. 19, 2021: vol. 2022, N. 1; pp. 414-460; [Retrieved on Nov. 15, 2022]. Retrieved from the internet: <url: https://lirias.kuleuven.be/retrieve/ 657431.; abstract pp. 420-427; DOI: 10.46586/tches.V2022.i1.414-460.

* cited by examiner

COMPUTER ARCHITECTURE AND METHOD FOR PERFORMING LATTICE-BASED CRYPTOGRAPHIC PRIMITIVES WITH RESISTANCE TO SIDE-CHANNEL ATTACKS

FIELD OF THE INVENTION

This disclosure relates to protection of a cryptographic algorithm against power analysis attacks. In particular to a method and architecture of protecting CRYSTALS-Kyber against first order differential power analysis.

BACKGROUND OF THE INVENTION

Modern infrastructure relies on secure communication over public networks. Due to this fact, algorithms are needed to provide a method of protecting private information sent over insecure networks where the messages may be observed or modified. Cryptography is the field of mathematics which defines and uses algorithms which allow two parties to communicate over insecure networks with privacy, integrity, and authenticity. This is primarily done using asymmetric algorithms, which utilize a public and private key, and symmetric algorithms, which utilize a shared private key.

The security of asymmetric algorithms relies on keeping the private key secret. While modern algorithms are mathematically secure against cryptanalysis, the implementation of these algorithms may leak information through so-called side channels. Among these side channels is power consumption. Many of the operations of a microcontroller or ASIC consume different amounts of power depending the value of the operands. If an adversary has physical access to the device, they can gather power measurements as the algorithm is running and analyze these differences in power consumption to recover the secret value.

Another upcoming threat to cryptographic algorithms is quantum computing. Current algorithms rely on trap-door functions that are difficult for classical computers to solve, but are trivial for quantum computers. Because of this, NIST has decided to standardize new algorithms which are resistant to quantum computing. In particular, CRYSTALS-Kyber, a lattice based Key Encapsulation Mechanism (KEM) will be standardized for key establishment, and CRYSTALS-Dilithium, FALCON, and SPHINCS+ will be standardized as digital signature algorithms. CRYSTALS-Dilithium and FALCON are also lattice based algorithms. SPHINCS+ is a hash-based algorithm. These algorithms are secure against quantum computing; however, their implementations can still be vulnerable to power analysis attacks. As these are new algorithms, there are few prior works on protecting these algorithms against power analysis.

Thus, there is a need for methods and architectures efficiently implementing these algorithms that are resistant to power analysis attacks. This allows the algorithms to be deployed in insecure locations without risk of an adversary stealing the secret key through power analysis. Said method and architecture should minimize the performance and resource overhead of the protection on the base algorithm. Since key exchanges are vulnerable to "store now, decrypt later" attacks, they must be protected and deployed as soon as possible.

One known device used to execute lattice-based key encapsulation in a side-channel-resistant manner is built using a combination of hardware accelerators and software running in a microprocessor. This split makes implementation simpler since software can be easier to develop than custom hardware. The downside of this approach is excessive clock cycles used to communicate data between the processor and the accelerators and the large area overhead used by the microprocessor and its attached buses and memories. FIG. 2 depicts an example architecture following the said approach.

SUMMARY OF THE INVENTION

The key encapsulation described by the Kyber algorithm is useful for protecting communication between devices but the implementation may leave the system vulnerable to power analysis attacks. In particular, decapsulation may reuse the long-term secret key making it a target for differential power analysis attacks. Protecting this operation in software is possible, but comes with substantial performance overhead. A protected, specialized coprocessor can provide high performance while mitigating the threat of power analysis attacks. It is beneficial to minimize the footprint of such coprocessor to reduce the power consumption and manufacturing cost of the design.

The architecture and method described in this document provide an efficient hardware accelerator for Kyber key encapsulation which is protected against first order differential power analysis attacks.

The invention provides a computer processing method and system configured to perform lattice-based cryptographic primitives with resistance to side-channel attacks and comprising that overcomes the hereinafore-mentioned disadvantages of the heretofore-known devices and methods of this general type.

With the foregoing and other objects in view, there is provided, in accordance with the invention, a computer processing system configured to perform lattice-based cryptographic primitives with resistance to side-channel attacks that includes a computer processing architecture operably configured to perform at least one of key generation, key encapsulation, and key decapsulation and process security sensitive data, a plurality of memory banks segmented into separate share domains, a sampling submodule operably configured to perform hashing operations and centered binomial sampling routines and communicatively coupled to the plurality of memory banks, a polynomial arithmetic unit communicatively coupled to the plurality of memory banks and operably configured to perform polynomial multiplication, polynomial addition, and polynomial subtraction by processing the security sensitive data that is divided into shares stored on the plurality of memory banks, an auxiliary submodule communicatively coupled with the sampling submodule, communicatively coupled to the plurality of memory banks, and operably configured to perform share conversion, message decoding, and ciphertext compression, a data interface unit communicatively coupled to the plurality of memory banks, operably configured to perform input and output operations, operably configured to input data and output data in shares, and de-serialize the input data into polynomial coefficients operably configured to be utilized by the polynomial arithmetic unit, and a controller submodule operably configured to sequence any operations needed to perform the at least one of key generation, key encapsulation, and key decapsulation.

In accordance with a further feature of the present invention, the sampling submodule is operably configured to perform a rejection sampling routine.

In accordance with another feature, an embodiment of the present invention includes the data interface unit is operably configured to de-serialize the input data into polynomial coefficients stored on the plurality of memory banks for utilization by the polynomial arithmetic unit.

In accordance with another feature, an embodiment of the present invention includes a SHA3 unit and at least one sampling unit, wherein the SHA3 unit is operably configured to perform the hashing operations and operably configured to transfer sampling input data to the at least one sampling unit.

In accordance with a further feature of the present invention, the SHA3 unit is side-channel-resistant.

In accordance with yet another feature, an embodiment of the present invention includes the least one sampling unit having a rejection sampling unit operably configured to generate a public uniform array and a central binomial sampling unit operably configured to convert the sampling input data to centered binomial sampling data.

In accordance with a further feature, an embodiment of the present invention also includes the auxiliary submodule having a share-type converter operably configured to perform the share conversion, a message decoder operably configured to perform the message decoding, and a ciphertext compressor operably configured to perform the ciphertext compression, the share-type converter, wherein the message decoder, and the ciphertext compressor resistant to first-order side channel attacks.

In accordance with a further feature of the present invention, wherein the message decoder and the ciphertext compressor share the share-type converter to reduce area consumption.

In accordance with an additional feature, an embodiment of the present invention also includes the controller submodule having a processor, control code, a configuration register, a selection register, and a status register, wherein controller submodule is operably configured to alternatively sequence any of the operations needed to perform the least one of key generation, key encapsulation, and key decapsulation by only modifying the control code.

In accordance with an exemplary feature of the present invention, the computer processing architecture is operably configured to perform at least one of CRYSTALS-Kyber, Saber, NTRU, and FrodoKEM.

Also in accordance with the present invention, a computer-implemented method of performing lattice-based cryptographic primitives with resistance to first-order side-channel attacks is disclosed that includes performing at least one of key generation, key encapsulation, and key decapsulation with a computer processing architecture and processing security sensitive data with the computer processing architecture, performing hashing operations and centered binomial sampling routines with a sampling submodule, dividing the security sensitive data into shares and storing the divided shares on a plurality of memory banks, performing polynomial multiplication, polynomial addition, and polynomial subtraction with a polynomial arithmetic unit and processing the divided shares, performing share conversion, message decoding, and ciphertext compression with an auxiliary submodule, performing input and output operations, receiving data divided into shares, and de-serializing the received data into polynomial coefficients with a data interface unit, utilizing the polynomial coefficients by the polynomial arithmetic unit, and sequencing any operations needed to perform the at least one of key generation, key encapsulation, and key decapsulation by a controller submodule.

In accordance with yet another feature, an embodiment of the present invention includes performing rejection sampling routines with the sampling submodule.

In accordance with a further feature, an embodiment of the present invention also includes de-serializing the input data into polynomial coefficients stored on the plurality of memory banks with the data interface unit before utilizing the polynomial coefficients by the polynomial arithmetic unit.

In accordance with an additional feature, an embodiment of the present invention also includes performing the hashing operations with SHA3 unit resident on the sampling submodule and transferring sampling input data to a sampling unit resident on the sampling submodule.

In accordance with a further feature, an embodiment of the present invention also includes generating a public uniform array with a rejection sampling unit and converting the sampling input data to centered binomial sampling data with a central binomial sampling unit.

In accordance with a further feature, an embodiment of the present invention includes storing input data that is not de-serialized by the data interface unit on the plurality of memory banks.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

DETAILED DESCRIPTION

The present invention is a novel hardware computer processing architecture for computing the CRYSTALS KYBER-KEM in a way that resists first-order side-channel attacks. With side-channel-resistance we mean that observing the mean power consumption and/or timing does not reveal any secret information processed in the said computer processing architecture.

Figure 1:
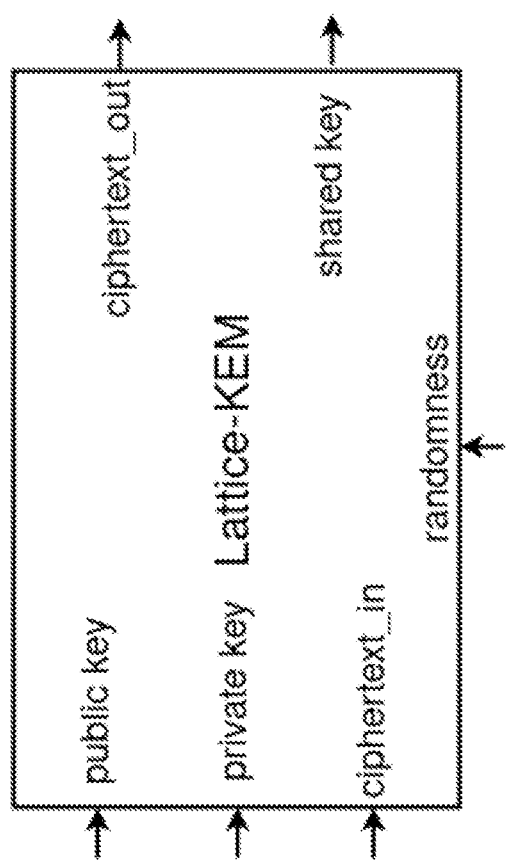
FIG. 1 is a block diagram of the top-level view of lattice-based key encapsulation mechanism.
Figure 2:
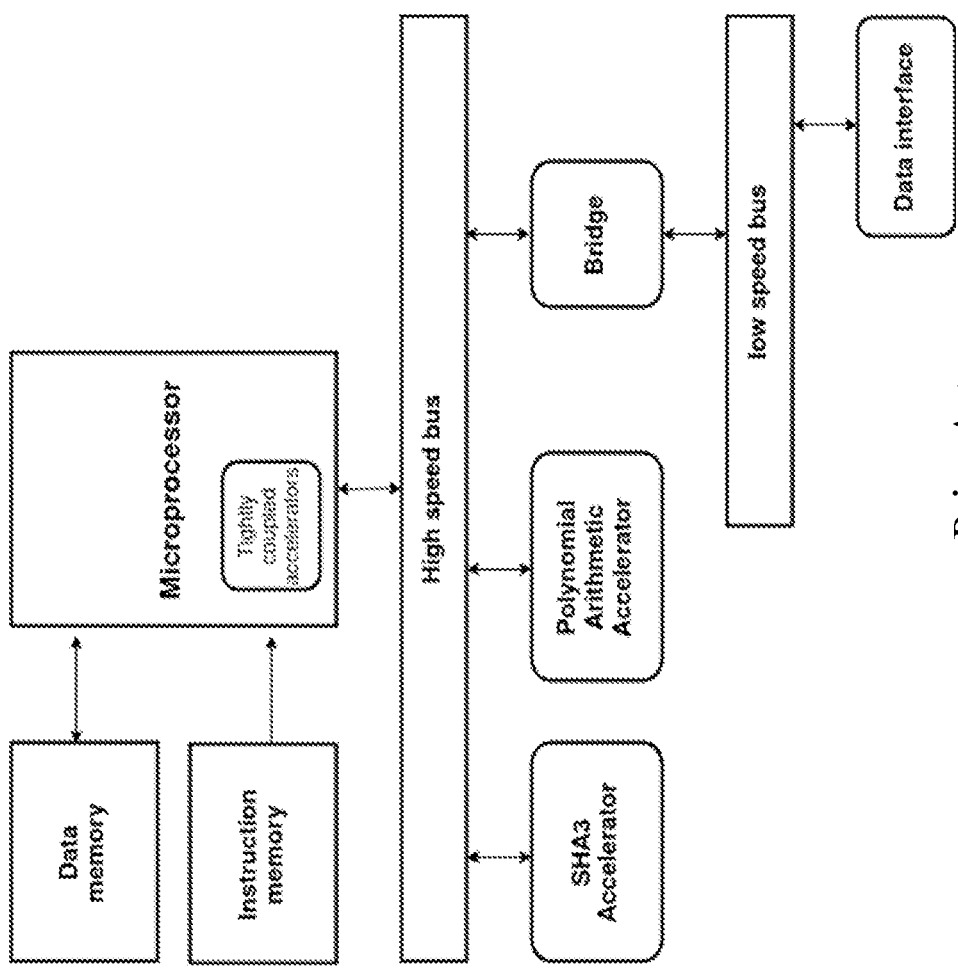
FIG. 2 is a prior art block diagram of prior art side-channel-resistant lattice-based key encapsulation mechanism.
Figure 3:
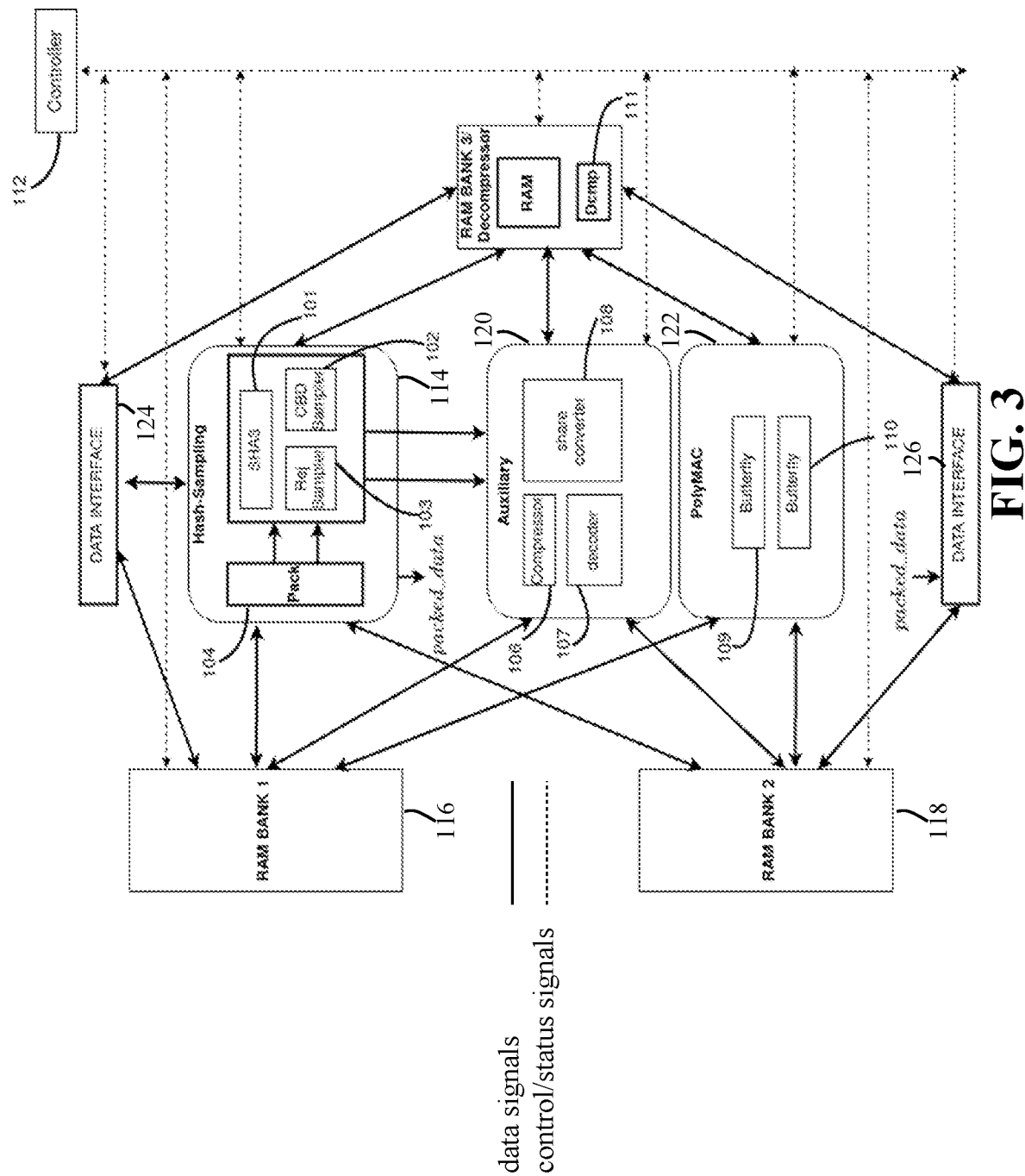
FIG. 3 is a block diagram of the architecture for side-channel-resistant lattice-based key encapsulation mechanism in accordance with one embodiment of the present invention.

Said another way, the processing system is operably configured to perform lattice-based cryptographic primitives with resistance to side-channel attacks. With reference to FIG. 3, which depicts a computer processing architecture block diagram that is configured to execute the KYBER-KEM algorithms the present invention provides an area-efficient submodules 101-111 to perform computation and a flexible controller submodule 112 that controls the submodules 101-111 to perform the algorithms that compose the KYBER-KEM algorithms. The computer processing architecture is also beneficially operably configured to perform at least one of CRYSTALS-Kyber, Saber, NTRU, and FrodoKEM.

Any data that gives the attacker an advantage in compromising system security is considered security sensitive information, this includes but not limited to private keys and shared secret keys. All security-sensitive information, such as the private key and all derived information that is calculated as a function of the private key, is masked and handled in two shares. All units use decoupled I/O and have a configuration interface to allow simple and efficient control logic.

The present invention supports all security levels defined by NIST for post-quantum cryptography.

The security level can be dynamically set in runtime. The datapath submodules can run in parallel to improve speed and also increase algorithmic noise, which increases the difficulty of side-channel attacks.

Figure 4:
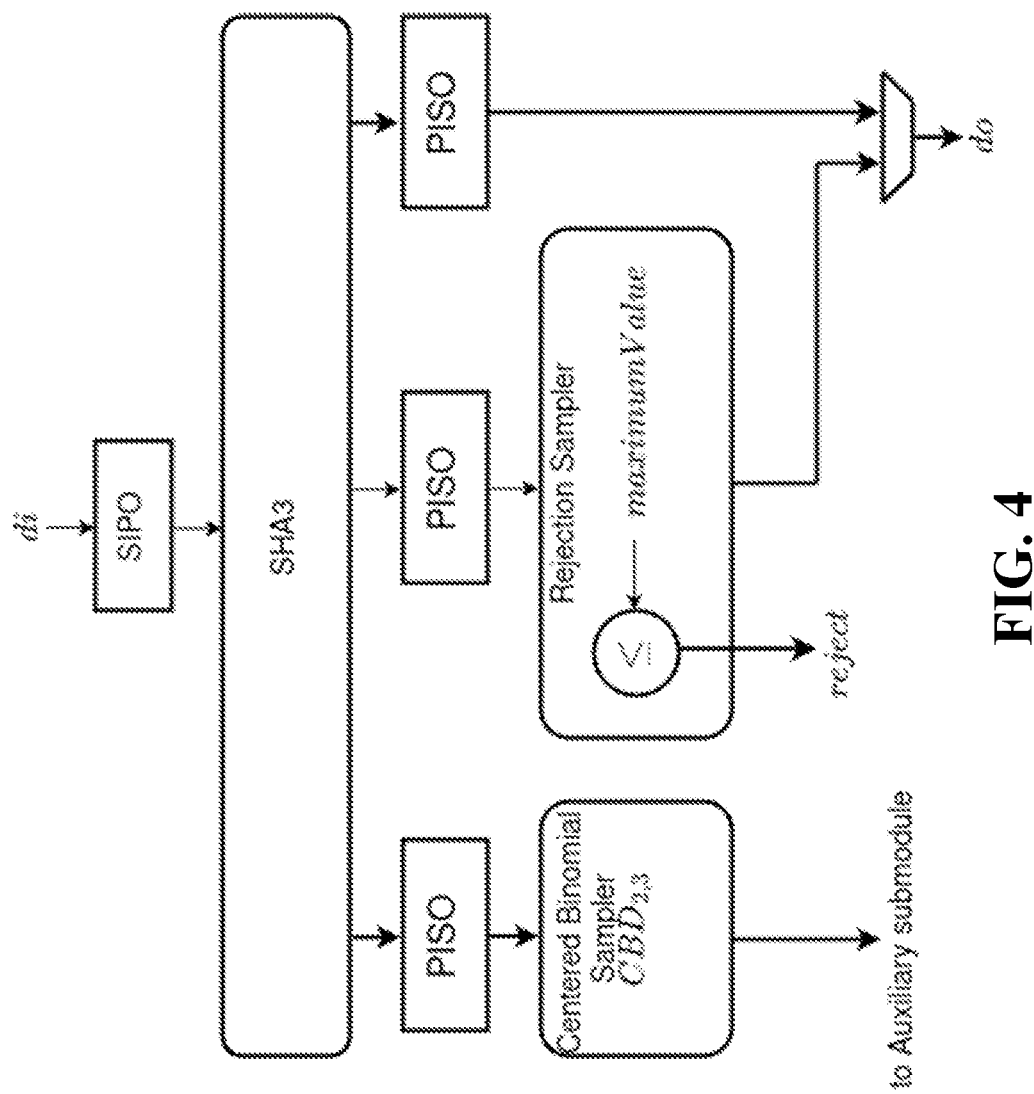
FIG. 4 is a block diagram a submodule that performs all hashing and sampling operations in accordance with one embodiment of the present invention.

The computer processing architecture depicted in FIG. 3 is operably configured to perform one or more operations that includes key generation, key encapsulation, and key decapsulation and to process security sensitive data. The present invention provides a hash and sampling submodule 114 operably configured to perform hashing operations and centered binomial sampling routines and communicatively coupled to a plurality of memory banks 116, 118. The memory banks are segmented into share domains where data shares are stored separate from each other. The hash and sampling submodule 114 is also operably configured to perform SHA3 operations using submodule 101, central binomial sampling using submodule 102, and uniform rejection sampling using submodule 103. The block diagram of said hash and sampling module is exemplified in FIG. 4. The SHA3 operations and central binomial sampling are performed on masked data, while rejection sampling is performed on non-masked data since rejection sampling is not the target of side-channel attacks. The input of the hash and sampling submodule comes from the RAM BANK 1-3 submodules. Parallel-In-Serial-Out (PISO) subfunctions are used to provide the correct data size to the centered binomial sampler and the rejection sampler. The sampling submodule 114 is also operably configured to perform a rejection sampling routine.

Said input is packed using pack unit 104. The packing operation converts a string of polynomial coefficients to a byte string. Said byte string is used either as an input to the SHA3 101 or sent to the data interface as output. Additionally, the SHA3 unit 101 is operably configured to perform the hashing operations and operably configured to transfer sampling input data to at least one sampling unit 102. The rejection sampling unit 103 is operably configured to generate a public uniform array and a central binomial sampling unit 102 operably configured to convert the sampling input data to centered binomial sampling data. The SHA3 unit is also side-channel-resistant.

Figure 5:
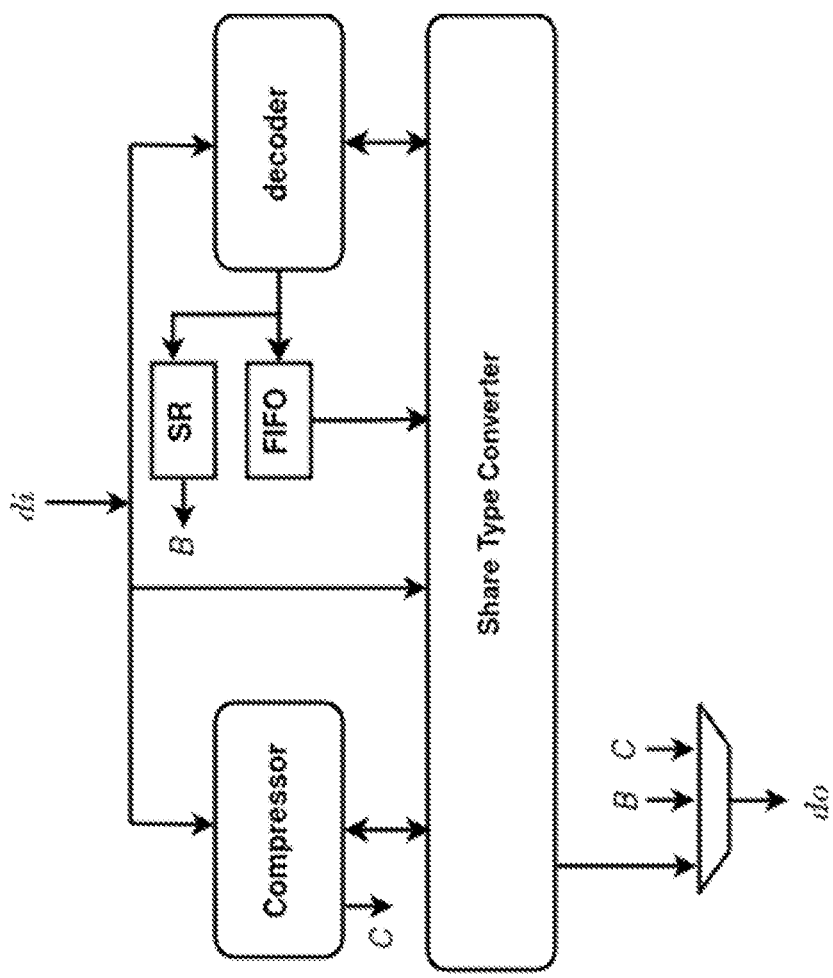
FIG. 5 is a block diagram of the architecture showing one instance of an auxiliary submodule in accordance with one embodiment of the present invention.

With reference to FIG. 3 and FIG. 5, an auxiliary submodule 120 performs ciphertext compression, message decoding, and share type conversion using submodules 106, 107, 108. This submodule 120 can receive input from the hash and sampling module 114 or from the memory in RAM BANK 1-3. The output of the auxiliary submodule 120 is stored in the memory banks 116, 118. The auxiliary submodule 120 performs all share type conversion. This allows sharing of resource among share type converter and other units in the auxiliary submodule 120. A shift register (SR) is utilized to accumulate the output of the decoder 107 before sending the accumulated output to the auxiliary submodule output. A First-in-First-Out (FIFO) unit is also beneficially utilized to briefly store part of the decoder output. The said FIFO unit is communicatively coupled with the share type converter. In another embodiment of the present invention, the auxiliary submodule 120 includes a share-type converter operably configured to perform the share conversion, a message decoder operably configured to perform the message decoding, and a ciphertext compressor operably configured to perform the ciphertext compression, wherein the share-type converter, the message decoder, and the ciphertext compressor are resistant to first-order side channel attacks. The message decoder and the ciphertext compressor also beneficially share the share-type converter to reduce area consumption.

With reference to FIG. 3, a polynomial arithmetic unit 122, or PolyMAC submodule, can perform the number theoretic transform (NTT), inverse NTT, pointwise multiplication using Karatsuba, polynomial addition, and polynomial subtraction. This submodule 122 beneficially utilizes two butterfly units 109, 110 to process two operations in parallel to improve speed. Said PolyMAC submodule 122 may optionally use a random permutation to shuffle the intermediate butterfly calculations of the NTT providing additional security against single trace attacks. Said permutation may be generated using different methods, such as a linear feedback shift register (LFSR) or through randomized sorting. The polynomial arithmetic unit 122 can be seen communicatively coupled to the plurality of memory banks 116, 118 and is also operably configured to perform polynomial multiplication, polynomial addition, and polynomial subtraction by processing the security sensitive data that is divided into shares stored on the plurality of memory banks 116, 118.

With reference to FIG. 3, the data interface units 124, 126 handle input and output in parallel to allow data input and output in two shares. The data interface performs de-serialization of input polynomials when instructed by the controller. In one embodiment, the data interface unit(s) 124, 126 are communicatively coupled to the plurality of memory banks 116, 118, operably configured to perform input and output operations, operably configured to input data and output data in shares, and de-serialize the input data into polynomial coefficients operably configured to be utilized by the polynomial arithmetic unit 122. The data interface unit(s) 124, 126 is/are operably configured to de-serialize the input data into polynomial coefficients stored on the plurality of memory banks 116, 118 for utilization by the polynomial arithmetic unit 122.

Figure 6:
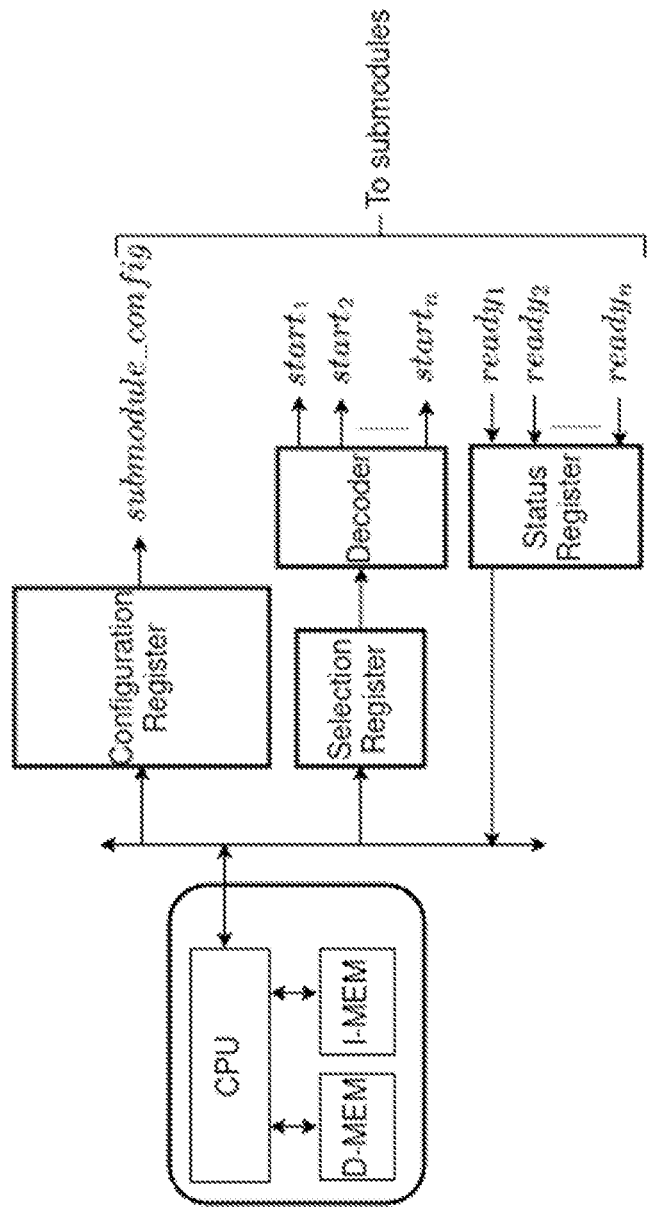
FIG. 6 is a block diagrams of an architecture of the controller submodule in accordance with one embodiment of the present invention in accordance with one embodiment of the present invention.

With reference to FIG. 6, said figure depicts a block diagram of the controller 112 depicted in FIG. 3. The controller 112 is optimized for flexibility and area efficiency by utilizing a minimal custom microprocessor with a small instruction memory I-MEM and data memory D-MEM. The said minimal microprocessor runs software that performs the operations of controlling the datapath to execute the KYBER-KEM algorithms. The controller 112 is operably configured to select the specific submodule in the architecture to control using, for example, the selection register, writes the configuration in the configuration register, and reads the submodule status using the status register. A decoder is used to activate the correct submodule to be configured according to the value in the selection register. Said another way, the controller submodule 112 is operably configured to sequence any operations needed to perform the at least one of key generation, key encapsulation, and key decapsulation.

The configuration register, selection register, and status register are shown in FIG. 6. The flexibility of this architecture comes from the ability to change the behavior of the controller by only changing the control software stored in the instruction memory I-MEM shown in FIG. 6. Said another way, the controller submodule 112 includes a processor, control code, a configuration register, a selection register, and a status register, wherein controller submodule is operably configured to alternatively sequence any of the operations needed to perform the least one of key generation, key encapsulation, and key decapsulation by only modifying the control code.

With reference back to FIG. 3, the memory banks RAM BANK 1-2, 116, 118 are composed of a set of RAM modules that store data that are sensitive to side-channel attacks. All sensitive data is split into two shares, with one share stored in RAM BANK 1 and the other share stored in RAM BANK 2. The storage and processing of sensitive data in two shares allow the architecture to resist first order side-channel attacks.

RAM BANK 3 and the decompressor 111 are bundled in one submodule to make connections to other submodules simpler. The decompressor performs the ciphertext decompression operation.

NTT shuffling allows the architecture to resist all known attacks targeting NTT leakage.

Figure 7:
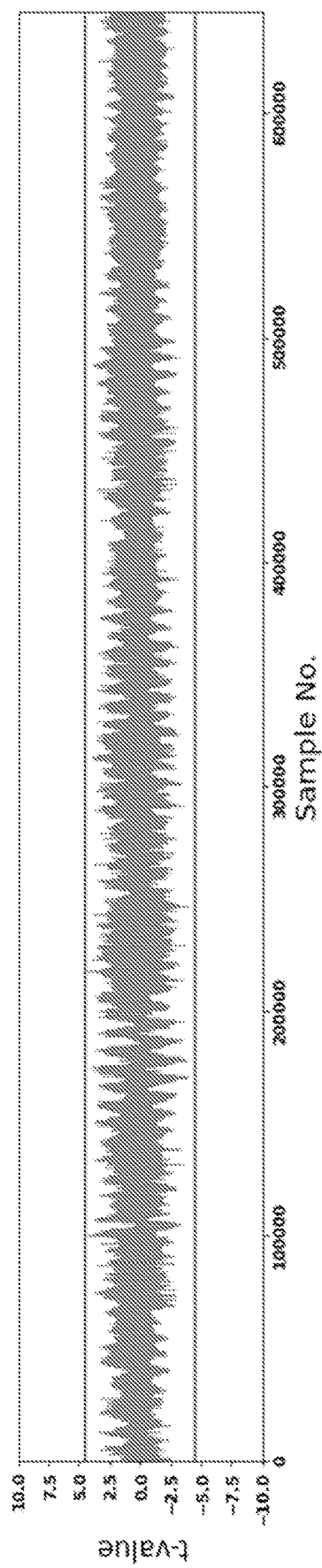
FIG. 7 is the result of a leakage assessment test.

With reference to FIG. 7, the result of a leakage assessment test shows all t values within the threshold lines indicating resistance to first-order attacks, demonstrating the efficacy of the present invention.

What is claimed is:

1. A computer processing system configured to perform lattice-based cryptographic primitives with resistance to side-channel attacks and comprising:
    a computer processing architecture operably configured to perform at least one of key generation, key encapsulation, and key decapsulation and process security sensitive data;
    a plurality of memory banks wherein the sensitive shares are mirrored such that control logic for memory address can be shared between memory banks and non-sensitive data is stored in a separate memory module;
    a polynomial arithmetic unit communicatively coupled to the plurality of memory banks and operably configured to perform polynomial multiplication, polynomial addition, and polynomial subtraction by processing the security sensitive data that is divided into shares stored on the plurality of memory banks;
    an auxiliary submodule;
        communicatively coupled with a sampling submodule, wherein hardware resources include a share type converter module shared between a decoder and a decompressor;
        communicatively coupled with the plurality of memory banks; and
        operably configured to perform share conversion, message decoding, and ciphertext compression;
    a data interface hardware unit having an interface configuration communicatively coupled to the plurality of memory banks, operably configured to perform input and output operations, operably configured to input data and output data in shares, and de-serialize the input data into polynomial coefficients operably configured to be utilized by the polynomial arithmetic unit; and
    a controller submodule with a processor operably configured to sequence any operations needed to perform the at least one of key generation, key encapsulation, and key decapsulation.

2. The computer processing system according to claim 1, wherein the sampling submodule is operably configured to perform a rejection sampling routine.

3. The computer processing system according to claim 1, wherein the data interface unit is operably configured to de-serialize the input data into polynomial coefficients stored on the plurality of memory banks for utilization by the polynomial arithmetic unit.

4. The computer processing system according to claim 1, wherein the sampling submodule further comprises:
    a SHA3 unit; and
    at least one sampling unit, wherein the SHA3 unit is operably configured to perform the hashing operations and operably configured to transfer sampling input data to the at least one sampling unit.

5. The computer processing system according to claim 4, wherein the SHA3 unit is side-channel-resistant.

6. The computer processing system according to claim 4, wherein the least one sampling unit further comprises:
    a rejection sampling unit operably configured to generate a public uniform array and a central binomial sampling unit operably configured to convert the sampling input data to centered binomial sampling data and performs operation on masked data to provide side-channel resistance.

7. The computer processing system according to claim 1, wherein the auxiliary submodule further comprises:
    a share-type converter operably configured to perform the share conversion; form arithmetic to Boolean or from Boolean to arithmetic;
    a message decoder operably configured to perform the message decoding; and a ciphertext compressor operably configured to perform the ciphertext compression, the share-type converter, the message decoder, and the ciphertext compressor resistant to first-order side channel attacks.

8. The computer processing system according to claim 7, wherein the message decoder and the ciphertext compressor share the share-type converter to reduce area consumption.

9. The computer processing system according to claim 1, wherein the controller submodule further comprises:
  a processor, control code, a configuration register, a selection register, and a status register, wherein the controller submodule is operably configured to alternatively sequence any of the operations needed to perform the least one of key generation, key encapsulation, and key decapsulation by only modifying the control code.

10. The computer processing system according to claim 1, wherein the computer processing architecture is operably configured to perform at least one of CRYSTALS-Kyber, Saber, NTRU, and FrodoKEM.

* * * * *